L. C. MARSHALL.
PISTON RING.
APPLICATION FILED MAY 6, 1920.
1,361,393.
Patented Dec. 7, 1920.
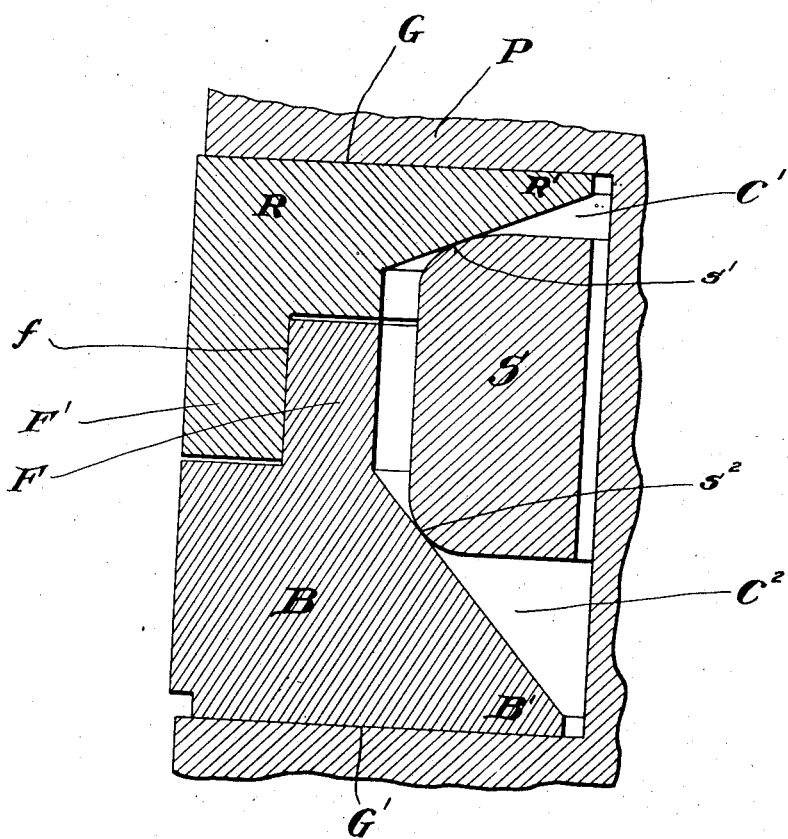
Inventor
Lewis C. Marshall
by Roberts Roberts Cushman
his Attorneys

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON-RING.

1,361,393.

Specification of Letters Patent.  Patented Dec. 7, 1920.

Application filed May 6, 1920. Serial No. 379,256.

*To all whom it may concern:*

Be it known that I, LEWIS C. MARSHALL, a citizen of the United States, and resident of Walpole, in the county of Norfolk and State of Massachusetts, have invented new and useful Improvements in Piston-Rings, of which the following is a specification.

My invention relates to ring-packing for pistons, and has for its object the preservation of pressure proof contact between a member of a ring-packing and the piston in which it is mounted, while insuring adequate pressure proof contact between the ring packing and the cylinder in which the piston works.

The drawing hereto annexed illustrates my invention, and shows in section part of a piston, the ring-packing groove, and ring-packing itself.

The cylinder is not shown in the drawing, since its relationship to the parts illustrated is well known.

In the following description longitudinal means in a direction parallel to the axis of the piston; radial means in a direction at right angles to said piston axis.

Ring packing, in order to perform its functions properly, must exert pressure uniformly in all radial directions against the cylinder, and longitudinally against one or both of the plane surfaces of the piston groove in which the ring-packing is seated. The ring packing herein described is of that type in which an interior expander ring, pressing against packing ring sections exterior to it, exerts both radial and longitudinal thrust against the packing ring sections, so as to preserve close contact at all times against the cylinder wall and the plane surfaces of the piston groove, in order to render the packing pressure proof.

The expander ring, in packings of this type bears against an inclined surface or surfaces on the interior of the packing ring or ring sections, so that by wedge-action it exerts both longitudinal and radial stress.

The improvements herein described are such as to produce a predominant longitudinal stress on one ring section, a predominant radial stress on the other, and to transmit radial stress from the latter ring section to the former.

In the drawings, P represents a portion of the piston, G and G' the plane surfaces of the circumferential piston-groove, B a base ring, R a crown ring. The base ring B is the larger of these two ring sections. Flanges F and F', formed on the two ring sections, mutually interfit, and are in close sliding contact at the cylindrical surfaces of junction at $f$. The base ring flange F is interior to the crown ring flange F'.

These ring sections are shaped internally to form ledges at B' and R'; surfaces $C^2$ and C' of these are inclined respectively to the groove surfaces G' and G, but at different angles, the angle of inclination between surface $C^2$, and surface G' is greater than the angle of inclination between surface C' and surface G.

The expander ring S, which is a circular spring, has rounded edges which bear at $s'$ and $s^2$ on the conical surfaces C' and $C^2$ respectively.

By reason of the inclination of surface C', the wedge action of the expander ring S against it is pronounced; the longitudinal component being larger than the radial component. Thus, the liability of the crown ring R to break its joint with the plane surface G, is reduced to negligibility; the more so as the crown ring R is the smaller of the two ring sections and furnishes less mass to assert inertia at the instants of reversal of piston-motion.

This acute angle wedge-relationship between the crown ring R and the expander ring S reduces the radial stress exerted on the ring R and by it against the cylinder wall.

To supplement this reduced radial stress, the flange F, bearing against the interior of flange F', supplies a radial thrust derived from the expansive effect of the expander ring S', exerted at $s^2$ on the conical surface $C^2$, which lies at a much greater angle than does surface C', with the plane piston-groove surface adjacent. At this ledge-surface the radial component of stress is relatively large, and the longitudinal component relatively small; so that the base ring B is vigorously expanded, and transfers its radial effect to the crown ring R, through the medium of the flange-junction at $f$.

So long as one of two packing ring sections preserves tight contact with both the cylinder wall and a plane surface of the piston groove, and the joint between the two ring sections is practically tight, the ring-packing as a whole will be pressure proof,

*i. e.*, preventive of by-pass leaks around the packing. The effective longitudinal wedging action of the expander ring on the relatively light crown ring supplies the permanent longitudinal pressure and contact; the effective radial stress, exerted on the crown ring R through the flange-contact at *f*, by the spring action on the wide-angled ledge surface at $C^2$, insures permanent close contact between the crown ring and the cylinder. If the base ring B, by reason of its superior mass, moves longitudinally from the surface $G'$, its movement will momentarily increase the pressure of the crown ring longitudinally against surface G. Tendency of the relatively light crown ring R to jump off its seat on surface G is effectually resisted by the stress of the expander ring S against the surface $C'$.

What I claim and desire to secure by Letters Patent, is:

1. In piston packing, the combination of a circumferentially grooved piston, the groove thereof having plane surfaces, a base ring and a crown ring, each having a plane face seating on a plane surface of said groove, the base ring and crown ring provided with interfitting flanges, that of the base ring inside that of the crown ring, each of said rings having an interior ledge at an inclination to the plane groove surface adjacent thereto, the said inclination of the ledge on the base ring being greater than the inclination of the ledge of the crown ring, and an expander ring bearing against both ledges.

2. In piston packing, the combination of a circumferentially grooved piston, the groove thereof having plane surfaces, a base ring and a crown ring, each having a plane face seating on a plane surface of said groove, the base ring and crown ring provided with interfitting flanges, that of the base ring inside that of the crown ring, each of said rings having an interior ledge at an inclination to the plane groove surface adjacent thereto, the said inclination of the ledge on the base ring being greater than the inclination of the ledge of the crown ring, the crown ring having less mass than the base ring, and an expander ring bearing against both ledges.

Signed by me at Boston, Massachusetts, this first day of May, 1920.

LEWIS C. MARSHALL.